(12) United States Patent
Ishikura

(10) Patent No.: US 10,500,565 B2
(45) Date of Patent: Dec. 10, 2019

(54) POROUS BODY AND METHOD FOR PRODUCING THE SAME, INK JET PRINTING METHOD AND INK JET PRINTING APPARATUS

(71) Applicant: CANON KABUSHIKI KAISHA, Tokyo (JP)

(72) Inventor: Hiroe Ishikura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/016,922

(22) Filed: Jun. 25, 2018

(65) Prior Publication Data
US 2019/0001301 A1    Jan. 3, 2019

(30) Foreign Application Priority Data
Jun. 30, 2017    (JP) .................... 2017-129727

(51) Int. Cl.
| | |
|---|---|
| *B41M 7/00* | (2006.01) |
| *B01J 20/26* | (2006.01) |
| *B01J 20/28* | (2006.01) |
| *B41J 11/00* | (2006.01) |
| *B41J 2/01* | (2006.01) |

(52) U.S. Cl.
CPC ....... *B01J 20/261* (2013.01); *B01J 20/28023* (2013.01); *B01J 20/28085* (2013.01); *B41J 11/0015* (2013.01); *B41J 2002/012* (2013.01); *B41M 7/00* (2013.01)

(58) Field of Classification Search
CPC ............. B41J 11/0015; B41J 2002/012; B01J 20/261; B01J 20/28085; B01J 20/28023; B41M 7/00
See application file for complete search history.

(56) References Cited

U.S. PATENT DOCUMENTS

| | | |
|---|---|---|
| 2014/0165517 A1 | 6/2014 | Nara et al. |
| 2015/0056471 A1 | 2/2015 | Joo et al. |
| 2015/0367613 A1 | 12/2015 | Deguchi et al. |

FOREIGN PATENT DOCUMENTS

| | | |
|---|---|---|
| JP | 2001-179959 A | 7/2001 |
| JP | 2013-063424 A | 4/2013 |
| JP | 2015-513007 A | 4/2015 |
| JP | 2016-19970 A | 2/2016 |
| WO | 2013/123137 A1 | 8/2013 |

*Primary Examiner* — Sharon A. Polk
(74) *Attorney, Agent, or Firm* — Venable LLP

(57) ABSTRACT

The present invention provides a porous body for the absorption of a liquid component contained in an ink image on an ink receiving medium, the porous body including a fiber having a pore structure in the inside, wherein the pore structure satisfies the following requirements (a) and (b), and an inter-fiber void ratio which indicates the volume ratio of a void formed between the each fibers is 40% or more to 80% or less: (a) average pore size/average fiber diameter is 0.2 or less; and (b) an intra-fiber void ratio is 5% or more to 40% or less.

4 Claims, 6 Drawing Sheets

POROUS BODY AND METHOD FOR PRODUCING THE SAME, INK JET PRINTING METHOD AND INK JET PRINTING APPARATUS

BACKGROUND OF THE INVENTION

Field of the Invention

The present invention relates to a porous body and a method for producing the same, an ink jet printing method and an ink jet printing apparatus.

Description of the Related Art

In the case of forming an image by directly or indirectly applying ink containing a coloring material onto a printing medium such as paper, curl or cockling may occur due to the excessive absorption of a liquid component in the ink image by the printing medium. Accordingly, in order to rapidly remove a liquid component in an ink image, for example, Japanese Patent Application Laid-Open No. 2001-179959 proposes a method which involves absorbing and removing a liquid component from an ink image by bringing a belt-shaped polymer absorber into contact with the ink image. Meanwhile, a porous body obtained by laminating a porous material having high trapping efficiency has been studied as a film for filtering impurities such as dust in a gas or a liquid (Japanese Patent Application Laid-Open No. 2013-063424, Japanese Patent Application Laid-Open No. 2016-19970 and Japanese Patent Application Laid-Open No. 2015-513007).

SUMMARY OF THE INVENTION

The present invention is directed to providing a porous body that can sufficiently remove a liquid component from an ink image and suppress image deletion, even when repetitively used, and a method for producing the same. The present invention is also directed to providing an ink jet printing method using the porous body and an ink jet printing apparatus including the porous body.

One aspect of the present invention provides a porous body for the absorption of a liquid component contained in an ink image on an ink receiving medium, the porous body including a fiber having a pore structure in the inside, wherein the pore structure satisfies the following requirements (a) and (b), and an inter-fiber void ratio which indicates the volume ratio of a void formed between the each fibers is 40% or more to 80% or less:
(a) average pore size/average fiber diameter is 0.2 or less; and
(b) an intra-fiber void ratio is 5% or more to 40% or less.

An alternative aspect of the present invention provides a method for producing a porous body for the absorption of a liquid component contained in an ink image on an ink receiving medium, including forming the porous body by an electrospinning method, the porous body including a fiber having a pore structure in the inside, wherein the pore structure satisfies the requirements (a) and (b), and an inter-fiber void ratio which indicates the volume ratio of a void formed between the each fibers is 40% or more to 80% or less.

An alternative aspect of the present invention provides an ink jet recording method including: applying ink onto an ink receiving medium to form an ink image; and removing at least a portion of a liquid component from the ink image by bringing a porous body into contact with the ink image, the porous body including a fiber having a pore structure in the inside, wherein the pore structure satisfies the requirements (a) and (b), and an inter-fiber void ratio which indicates the volume ratio of a void formed between the each fibers is 40% or more to 80% or less.

An alternative aspect of the present invention provides an ink jet printing apparatus including: an ink application apparatus which applies ink onto an ink receiving medium to form an ink image; and a liquid absorbing member having a porous body which comes into contact with the ink image and absorbs at least a portion of a liquid component from the ink image, the porous body including a fiber having a pore structure in the inside, wherein the pore structure satisfies the requirements (a) and (b), and an inter-fiber void ratio which indicates the volume ratio of a void formed between the each fibers is 40% or more to 80% or less:

Further features of the present invention will become apparent from the following description of exemplary embodiments with reference to the attached drawings.

DESCRIPTION OF THE EMBODIMENTS

Figure 1:
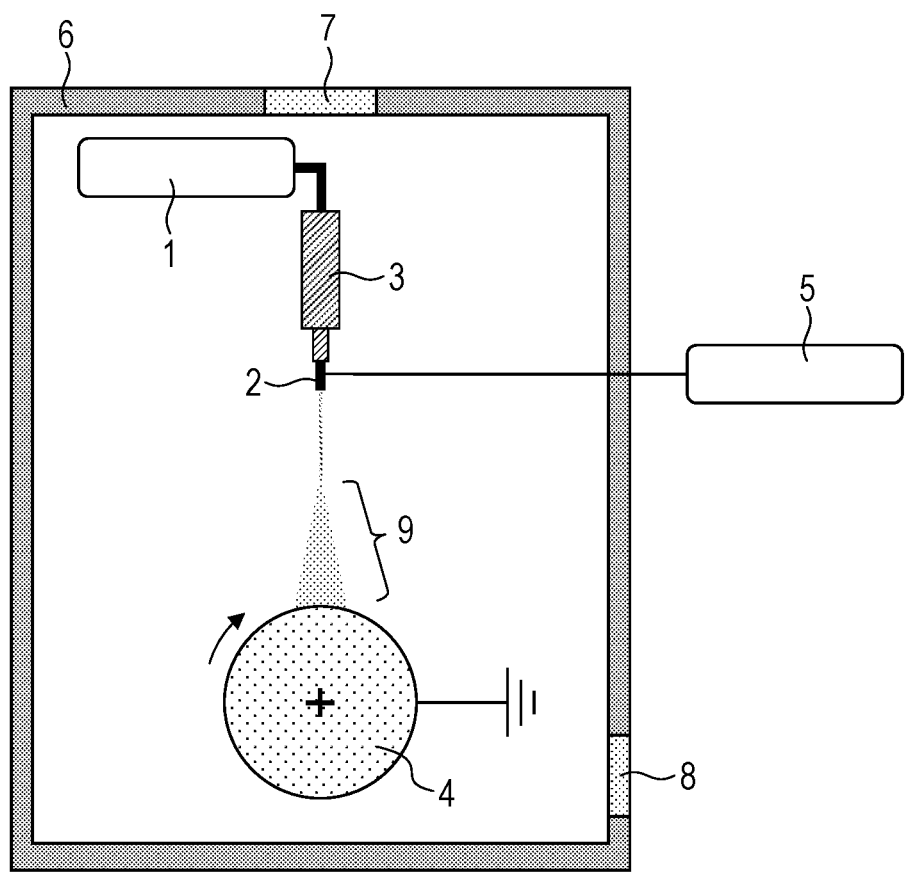
FIG. 1 is a schematic view illustrating one example of the configuration of a fiber production apparatus for use in the method for producing a porous body according to the present invention.

The studies of the present inventors have revealed that use of a polymer absorber described in Japanese Patent Application Laid-Open No. 2001-179959 can perform liquid component removal from an ink image, which is however not sufficient and needs further improvement. Also, porous bodies described in Japanese Patent Application Laid-Open No. 2013-063424, Japanese Patent Application Laid-Open No. 2016-19970 and Japanese Patent Application Laid-Open No. 2015-513007 are not aimed at absorbing a liquid component and have been found to insufficiently remove a liquid component from an ink image in some cases even if utilized as a member for liquid component absorption from an ink image. Particularly, it has been found that upon contact with an ink image, these porous bodies may cause so-called "image deletion", a phenomenon in which a portion of a liquid component, a coloring material and solid matter other than the coloring material and the like in ink is swept toward a back end in the moving direction of an ink image; thus a favorable image cannot be obtained.

Preferred embodiments of the present invention will now be described in detail in accordance with the accompanying drawings.

Hereinafter, the present invention will be described in detail with reference to exemplary embodiments.

[Porous Body]

The porous body according to the present invention is a porous body for the absorption of a liquid component contained in an ink image on an ink receiving medium. The porous body includes a fiber having a pore structure in the inside. Also, the pore structure satisfies the following requirements (a) and (b), and an inter-fiber void ratio which indicates the volume ratio of a void formed between the each fibers is 40% or more to 80% or less:
(a) average pore size/average fiber diameter is 0.2 or less; and
(b) an intra-fiber void ratio is 5% or more to 40% or less.

The porous body according to the present invention includes a fiber having a pore structure in the inside, wherein the pore structure satisfies the requirements (a) and (b), and an inter-fiber void ratio which indicates the volume ratio of a void formed between the each fibers is 40% or more to 80% or less. Therefore, the porous body according to the present invention can improve liquid component absorbability while maintaining the strength of the fiber. As a result, the porous body according to the present invention can sufficiently remove a liquid component from ink images even if repetitively brought into contact with the ink images. Thus, image deletion is suppressed, and a favorable image is obtained. Although the details of the mechanism underlying such an effect are unknown, the present inventors believe that the liquid component absorbability is improved because a liquid component can be absorbed not only to a void between the each fibers constituting the porous body but to the inside of the fiber. Furthermore, the porous body according to the present invention is capable of removing a liquid component, regardless of its type, and has a wide range of choice of a material and a structure. In the present invention, the pore structure means to have holes in the fiber. In the present invention, the void formed between the each fibers is a space between the each fibers and means that this space has no fiber, i.e., has a vacancy between the each fibers.

The porous body according to the present invention can be a porous body which comes into contact with an ink image containing ink on an ink receiving medium (also referred to as a discharge receiving medium) and removes at least a portion of a liquid component from the ink image. As mentioned later, the ink receiving medium can be a transfer body, a printing medium or the like. The ink image is an image containing at least ink and may contain a reaction solution and the like mentioned later. The porous body absorbs and removes at least a portion of a liquid component contained in the ink image by contact with the ink image. The liquid component is a liquid such as water or an organic solvent contained in the ink, the reaction solution or the like.

The porous body includes a fiber having a pore structure in the inside. The fiber can include a resin. Examples of the resin that can be used include, but are not particularly limited to, polyacrylonitrile (PAN), polycarbonate, polyethylene, polypropylene, polyethylene oxide, polyethylene glycol, polyethylene terephthalate, polyethylene naphthalate, poly-m-phenylene terephthalate, poly-p-phenylene isophthalate, polymethacrylic acid, polymethyl methacrylate, polyvinyl chloride, polyvinylidene chloride-acrylate copolymers, polyvinyl alcohol, polyvinylpyrrolidone, polyarylate, polyacetal, polystyrene, polysulfone (PSU), polyethersulfone, polyphenylsulfone, polyphenylene sulfide, polyamide, polyimide, polyamide imide, aramide, polyimide benzoxazole, polybenzimidazole, polyglycolic acid, polylactic acid and polyurethane. Alternatively, a polymer such as a cellulose compound, a polypeptide, a polynucleoside, a polynucleotide, a protein or an enzyme may be used. The fiber preferably includes a thermoplastic resin and can include polysulfone or polyacrylonitrile, from the viewpoint of film formability.

In addition, the fiber preferably includes a fluorine-containing resin (also referred to as a fluororesin). The fluorine-containing resin can suppress the adhesion of a coloring material contained in an ink image upon contact with the ink image, because of its low surface free energy and high cleaning properties. Examples of the fluorine-containing resin include polytetrafluoroethylene (PTFE), polychlorotrifluoroethylene (PCTFE), polyvinylidene fluoride (PVDF), polyvinyl fluoride (PVF), perfluoroalkoxy (PFA), fluorinated ethylene-propylene (FEP), ethylene tetrafluoroethylene (ETFE), ethylene chlorotrifluoroethylene (ECTFE), poly(vinylidene fluoride-co-hexafluoropropylene) (PVDF-HFP) and polytetrafluoroethylene-hexafluoropropylene-vinylidene difluoride (PTFE-HFP-VDF). Among these resins, the fluororesin is preferably polyvinylidene fluoride from the viewpoint of the suppression of the adhesion of a coloring material. One or two or more of these resins may be used, if necessary.

The fiber has a pore structure in the inside, and the pore structure satisfies the following requirements (a) and (b):
(a) average pore size/average fiber diameter is 0.2 or less; and
(b) an intra-fiber void ratio is 5% or more to 40% or less.

When the value of average pore size/average fiber diameter exceeds 0.2 in the requirement (a), the resulting fiber tends to have low strength due to a large pore structure in the inside of the fiber. Therefore, the surface of the porous body tends to be destroyed when repetitively brought into contact with an ink receiving medium having an ink image, resulting in reduction in liquid component absorbability. The value of average pore size/average fiber diameter is preferably 0.001 or more to 0.2 or less, more preferably 0.01 or more to 0.2 or less. The average fiber diameter is preferably 0.1 µm or more to 5.0 µm or less, more preferably 0.5 µm or more to 4.0 µm or less, further preferably 1.0 µm or more to 3.0 µm or less, from the viewpoint of decreasing the average pore size of the porous body for liquid component removability. The average pore size is preferably 0.01 µm or more to 1 µm or less, more preferably 0.05 µm or more to 0.7 µm or less, further preferably 0.1 µm or more to 0.5 µm or less, from the viewpoint of liquid component absorbability and the strength of the fiber. The average fiber diameter and the average pore size are values measured by methods mentioned later.

When the intra-fiber void ratio is less than 5% in the requirement (b), it is difficult to improve liquid component absorbability due to the reduced amount of the liquid component taken up into the fiber. On the other hand, when the intra-fiber void ratio exceeds 40%, the fiber tends to have low strength and the surface of the porous body tends to be destroyed when repetitively brought into contact with an ink receiving medium having an ink image, resulting in reduction in liquid component absorbability. The intra-fiber void ratio is preferably 7% or more to 40% or less, more preferably 10% or more to 40% or less. The intra-fiber void ratio is a value measured by a method mentioned later.

Since the porous body includes a fiber, a void is formed between the each fibers. The inter-fiber void ratio which indicates the volume ratio of the void formed between the each fibers to the whole porous body is 40% or more to 80% or less, preferably 50% or more to 80% or less, more preferably 60% or more to 80% or less, from the viewpoint of liquid component absorbability. The inter-fiber void ratio is a value measured by a method mentioned later.

It is prefer that the porous body include a first fiber including a first material and a second fiber including a second material, and at least one of the first fiber and the second fiber preferably have the pore structure, from the viewpoint of liquid component absorbability. In this case, both of the first fiber and the second fiber preferably have the pore structure. Examples of the first material that can be used include polyacrylonitrile (PAN), polycarbonate, polyethylene, polypropylene, polyethylene oxide, polyethylene glycol, polyethylene terephthalate, polyethylene naphthalate, poly-m-phenylene terephthalate, poly-p-phenylene isophthalate, polymethacrylic acid, polymethyl methacrylate, polyvinyl chloride, polyvinylidene chloride-acrylate copolymers, polyvinyl alcohol, polyvinylpyrrolidone, polyarylate, polyacetal, polystyrene, polysulfone (PSU), polyethersulfone, polyphenylsulfone, polyphenylene sulfide, polyamide, polyimide, polyamide imide, aramide, polyimide benzoxazole, polybenzimidazole, polyglycolic acid, polylactic acid and polyurethane. Alternatively, a polymer such as a cellulose compound, a polypeptide, a polynucleoside, a polynucleotide, a protein or an enzyme may be used. Examples of the second material include polytetrafluoroethylene (PTFE), polychlorotrifluoroethylene (PCTFE), polyvinylidene fluoride (PVDF), polyvinyl fluoride (PVF), perfluoroalkoxy (PFA), fluorinated ethylenepropylene (FEP), ethylene tetrafluoroethylene (ETFE), ethylene chlorotrifluoroethylene (ECTFE), poly(vinylidene fluoride-co-hexafluoropropylene) (PVDF-HFP) and polytetrafluoroethylene-hexafluoropropylene-vinylidene difluoride (PTFE-HFP-VDF). When both of the first fiber and the second fiber have the pore structure, the values of the average fiber diameter, the average pore size and the intra-fiber void ratio are average values from the first fiber and the second fiber. Also, the porous body may include three or more fibers.

The pore in the inside of the fiber preferably communicates with the fiber surface from the viewpoint of liquid component absorbability. In this case, the pore is preferably filled with a liquid in advance before removal of a liquid component from an ink image. This is because the porous body can be used stably and repetitively without variations in liquid component absorption performance even if the material forming the fiber is a material having high surface energy, such as a fluorine-containing resin. This is probably because a pump-priming effect is obtained by filling the pore with a liquid (particularly, a highly wettable liquid) in advance. Examples of the liquid that fills the pore in advance include, but are not limited to, an aqueous solution containing a surfactant and an aqueous solvent containing a surfactant. The filling of the pore with the liquid can be performed, for example, by dipping the porous body in the liquid.

The thickness of the porous body is not particularly limited and is preferably 5 to 500 µm, more preferably 10 to 200 µm.

[Method for Producing Porous Body]

The method for producing a porous body according to the present invention is a method for producing a porous body for the absorption of a liquid component contained in an ink image on an ink receiving medium and includes forming the porous body by an electrospinning method. The porous body includes a fiber having a pore structure in the inside, wherein the pore structure satisfies the requirements (a) and (b), and an inter-fiber void ratio which indicates the volume ratio of a void formed between the each fibers is 40% or more to 80% or less. The method for producing a porous body according to the present invention can produce the porous body according to the present invention efficiently and conveniently. The method for producing a porous body preferably includes: forming a porous body including a fiber by an electrospinning method (hereinafter, referred to as a fiber formation step); and heating the porous body (hereinafter, referred to as a heat treatment step). Hereinafter, each step will be described.

[Fiber Formation Step]

Examples of the method for forming the fiber include electrospinning and melt blow methods. In the present invention, an electrospinning method is preferably used from the viewpoint that a fine fiber can be formed. This is because higher fiber diameter leads to higher liquid component trapping efficiency. The electrospinning method includes solution electrospinning and melt electrospinning methods. A solution electrospinning method is preferably used because this method is capable of forming a finer fiber. The solution electrospinning method is a method which involves applying positive high voltage to a resin solution and generating a fiber in the course of spraying the resin solution to a grounded or negatively charged surface of a collector. The resin solution is discharged from a device having a small diameter, such as a nozzle. In general, a smaller nozzle diameter leads to higher fiber diameter.

The resin solution is a solution containing an electrospinnable resin dissolved in a solvent. A resin contained in the fiber mentioned above can be used as the resin. The weight-average molecular weight (Mw) of the resin is preferably 10,000 to 1,000,000, more preferably 100,000 to 500,000. The weight-average molecular weight of 10,000 or more hinders the resin from becoming the form of beads and facilitates forming a fiber. Also, the weight-average molecular weight of 1,000,000 or less allows the resin solution to be sufficiently drawn and facilitates forming a fiber. The weight-average molecular weight is a value measured by gel permeation chromatography (GPC).

The solvent is not particularly limited as long as the solvent can dissolve the resin. Examples thereof include water, acetone, methyl isobutyl ketone, diisobutyl ketone, acetophenone, ethyl acetate, butyl acetate, methanol, ethanol, propanol, isopropanol, hexafluoroisopropanol, tetrahydrofuran, dimethyl sulfoxide, 1,4-dioxane, pyridine, N,N-dimethylformamide, N,N-dimethylacetamide, N-methyl-2-pyrrolidone, acetonitrile, formic acid, toluene, benzene, cyclohexane, cyclohexanone, carbon tetrachloride, methylene chloride, chloroform, trichloroethane, ethylene carbonate, diethyl carbonate and propylene carbonate. These solvents can be used alone or as a mixture. Among these solvents, a solvent that can completely dissolve the resin is preferably used as the solvent.

The resin solution preferably contains a high-boiling solvent for the purpose of controlling the evaporation rate of the solvent in order to form a pore structure in the fiber. The evaporation of the solvent proceeds gradually after landing on a collector to thereby form a fiber in which a portion impregnated with the solvent has become a pore. Thus, the pore has a structure that communicates with the fiber surface. For spinning in an environment involving a temperature of 25° C. and a humidity of 25%, the resin solution preferably contains a high-boiling solvent having a boiling point of 150° C. or higher to 220° C. or lower, though differing depending on the type of the resin, the weight-average molecular weight of the resin, the type of the solvent, the fiber diameter of interest and the like The content of this high-boiling solvent is preferably 10% by mass or more, more preferably 10% by mass or more to 90% by mass or less, further preferably 35% by mass or more to 50% by mass or less, with respect to the total mass of the resin solution. Examples of the high-boiling solvent include N,N-dimethylformamide, N,N-dimethylacetamide, N-methyl-2-pyrrolidone, dimethyl sulfoxide, acetophenone and cyclohexanone. One of these high-boiling solvents may be used, or two or more thereof may be used in combination. When the resin solution contains a solvent other than the high-boiling solvent, the boiling point of the solvent other than the high-boiling solvent can be, for example, 50° C. or higher to lower than 150° C. Also, the resin solution may further contain a salt such as lithium chloride, lithium bromide or sodium chloride, a surfactant or the like as an additive.

The concentration of the resin in the resin solution is preferably 1 to 50% by mass, more preferably 10 to 40% by mass, with respect to the total mass of the resin solution from the viewpoint of applicability to the electrospinning method, though differing depending on the composition of the resin, the molecular weight of the resin, the type of the solvent and the like. The concentration of 1% by mass or more tends to allow the solvent to evaporate sufficiently and facilitate forming a fiber. Also, the concentration of 50% by mass or less tends to allow the resin to be sufficiently dissolved in the solvent and facilitate drawing the resin solution and forming a fiber. The intra-fiber void ratio, the average pore size and the like can be controlled by the content of the high-boiling solvent or the concentration of the resin. For example, a larger content of the high-boiling solvent in the resin solution can enhance the intra-fiber void ratio. Also, a higher concentration of the resin in the resin solution can increase the average pore size of the fiber.

FIG. 1 illustrates one example of a fiber production apparatus for use in the solution electrospinning method. The fiber production apparatus illustrated in FIG. 1 has the following configuration: resin solution supply apparatus 1 which supplies the resin solution to resin solution reservoir 3 and nozzle 2; grounded collector 4 which collects fiber 9 prepared by drawing the resin solution discharged from the nozzle 2, by an electric field; voltage application apparatus 5 which applies voltage to the nozzle 2 in order to form the electric field between the nozzle 2 and the grounded collector 4; and inlet 7 and outlet 8 for exhausting an evaporated solvent by ventilation. The fiber production apparatus may have an air conditioner (not shown) in the inlet 7 in order to adjust the internal temperature and humidity of the spinning container 6.

The resin solution is supplied to the nozzle 2 via the resin solution reservoir 3 by the resin solution supply apparatus 1. The supplied resin solution is extruded from the nozzle 2 while sprayed toward the collector 4 with a fiber formed in response to the drawing effect of the electric field between the grounded collector 4 and the nozzle 2 voltage-applied by the voltage application apparatus 5. Then, the sprayed fiber 9 is collected onto the collector 4 to form a porous body.

The resin solution supply apparatus 1 is not particularly limited, and, for example, a syringe pump, a tube pump or a dispenser can be used. The diameter (inside diameter) of the nozzle 2 is preferably, for example, 0.1 to 2.0 mm, though differing depending on the fiber diameter of the fiber 9 to be obtained. The nozzle 2 may be metallic or may be nonmetallic. The metallic nozzle 2 can be used as one of electrodes by the application of voltage from the voltage application apparatus 5. On the other hand, when the nozzle 2 is nonmetallic, an electrode can be placed in the inside of the nozzle 2 or within a supply pipe from the resin solution supply apparatus 1 to the nozzle 2, and the electric field can be allowed to act on the extruded resin solution by the application of voltage from the voltage application apparatus 5 to the electrode.

The voltage application apparatus 5 is not particularly limited, and, for example, a high-voltage direct current generation apparatus or a Van de Graaff generator can be used. The voltage to be applied is not particularly limited and is preferably 5 to 50 kV. In FIG. 1, the electric field is formed by applying voltage to the nozzle 2 by the voltage application apparatus 5 while grounding the collector 4. However, the electric field may be formed by grounding the nozzle 2 while applying voltage to the collector 4. Alternatively, the electric field may be formed by applying voltage to both the nozzle 2 and the collector 4 with potential difference.

The collector 4 is not particularly limited as long as the collector can collect the fiber 9. Examples of the shape of the collector 4 include a drum shape as illustrated in FIG. 1. For example, a nonwoven fabric, a woven fabric, a knit, a net, a flat plate or a belt made of a conductive material such as a metal or carbon or a nonconductive material such as an organic polymer may be used as the collector 4. The distance from the tip of the nozzle 2 to the collector 4 is preferably, for example, 5 to 30 cm, though differing depending on the fiber diameter of the fiber 9 to be obtained and the amount of a residual solvent.

[Heat Treatment Step]

When the resin constituting the fiber is a crystalline resin, the heating temperature for heat-treating the porous body (porous body before heat treatment) is preferably equal to or higher than Tg (glass transition temperature) of the resin to equal to or lower than 20° C. plus Tm (melting point) of the resin. On the other hand, when the resin constituting the fiber is a noncrystalline resin, the heating temperature is preferably equal to or higher than Tg of the resin to equal to or lower than 50° C. plus Tg of the resin. The heating temperature equal to or higher than Tg improves the close contact between bonded of the each fibers. On the other hand, the heating temperature equal to or lower than Tm+20° C. or Tg+50° C. can prevent air permeability from being reduced due to the clogging of the void by the melting of the fiber. Tg and Tm are values measured by differential scanning calorimetry (DSC). When the fiber includes a plurality of resins, Tg and Tm refer to Tg and Tm of a resin having the largest content (volume).

The porous body may be pressurized during the heat treatment. The pressurization of the porous body increases the contact area between the each fibers. Therefore, the fibers are easily bonded to each other, and the strength of the porous body can be further improved. The pressure for the pressurization is preferably 10 kg/cm$^2$ or less, more preferably 5 kg/cm$^2$ or less, in order to suppress reduction in liquid component absorbability caused by a decreased void resulting from fiber collapse. The lower limit of the pressure is not particularly limited and can be, for example, 1 kg/cm$^2$ or more.

A hot-air dryer, an oven, an infrared (IR) heating apparatus, a microwave heating apparatus or the like can be used as a heating apparatus. Further, a platen press, a roll press, a lamination apparatus, a calender apparatus or the like equipped with a heating mechanism can be appropriately used in the pressurization of the porous body.

[Ink Jet Printing Method and Ink Jet Printing Apparatus]

The ink jet printing method according to the present invention includes: applying ink onto an ink receiving medium to form an ink image; and removing at least a portion of a liquid component from the ink image by bringing a porous body into contact with the ink image. The porous body includes a fiber having a pore structure in the inside, wherein the pore structure satisfies the requirements (a) and (b), and an inter-fiber void ratio which indicates the volume ratio of a void formed between the each fibers is 40% or more to 80% or less. The ink jet printing method according to the present invention can suppress image deletion by sufficiently removing a liquid component from an ink image, and therefore produces a favorable image.

The ink jet printing apparatus according to the present invention includes: an ink application apparatus which applies ink onto an ink receiving medium to form an ink image; and a liquid absorbing member having a porous body which comes into contact with the ink image and absorbs at least a portion of a liquid component from the ink image. The porous body includes a fiber having a pore structure in the inside, wherein the pore structure satisfies the requirements (a) and (b), and an inter-fiber void ratio which indicates the volume ratio of a void formed between the each fibers is 40% or more to 80% or less. The ink jet printing apparatus according to the present invention can suppress image deletion by sufficiently removing a liquid component from an ink image, and therefore produces a favorable image.

Hereinafter, an ink jet printing apparatus according to an embodiment of the present invention will be described with reference to the drawings.

Examples of the ink jet printing apparatus of the present embodiment include: an ink jet printing apparatus configured such that ink is discharged onto a transfer body as an ink receiving medium to form an ink image, which is then subjected to liquid absorption by a liquid absorbing member, followed by the transfer of the ink image to a printing medium; and an ink jet printing apparatus configured such that an ink image is formed on a printing medium such as paper or cloth as an ink receiving medium, followed by liquid absorption from the ink image on the printing medium by a liquid absorbing member. In the present invention, the former ink jet printing apparatus is referred to as a transfer-type ink jet printing apparatus below for the sake of convenience. The latter ink jet printing apparatus is referred to as a direct drawing-type ink jet printing apparatus below for the sake of convenience.

Hereinafter, the ink jet printing apparatuses will be described, respectively.

[Transfer-Type Ink Jet Printing Apparatus]

Figure 2:
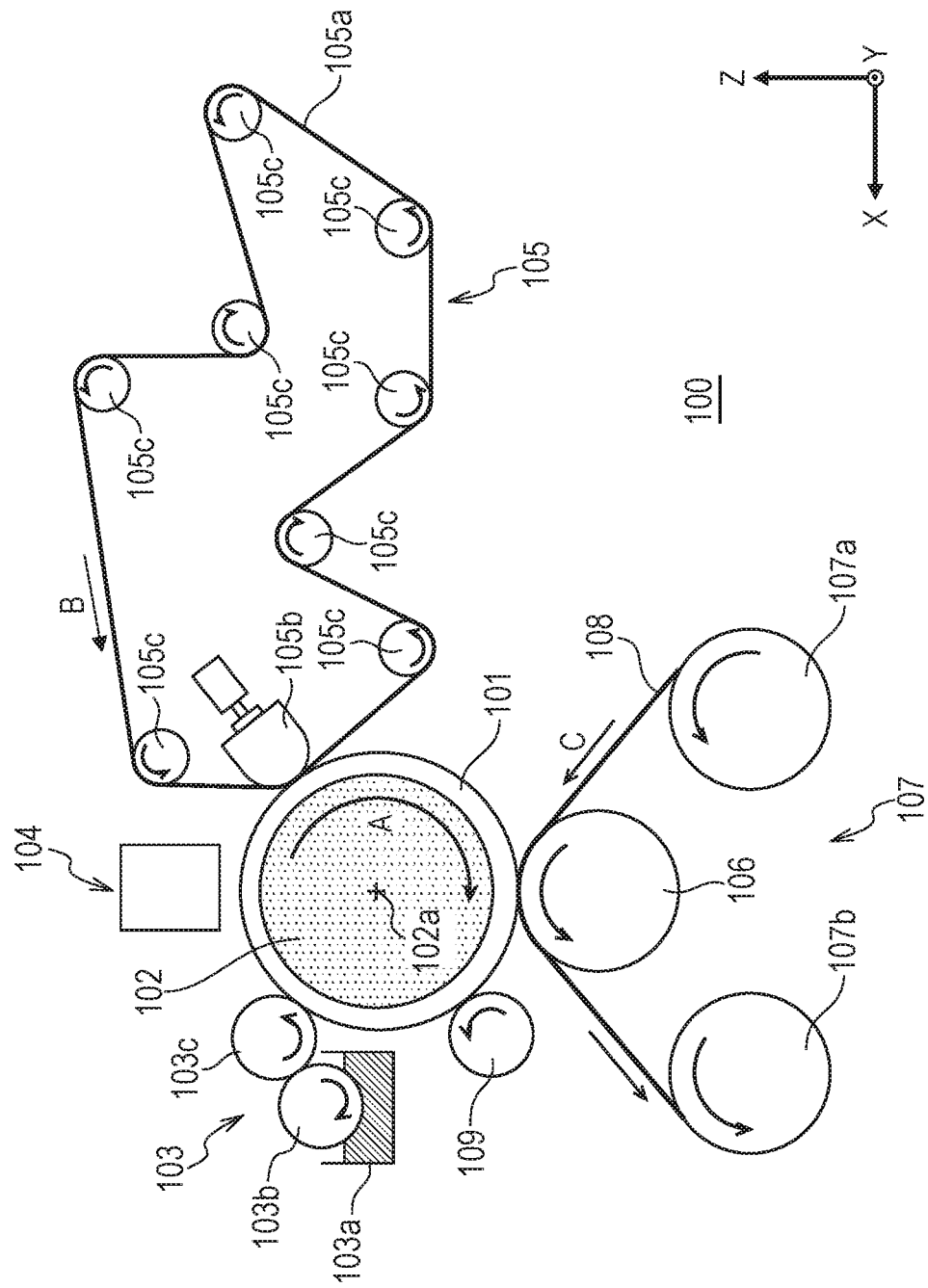
FIG. 2 is a schematic view illustrating one example of the configuration of a transfer-type ink jet printing apparatus according to one embodiment of the present invention.

FIG. 2 is a schematic view illustrating one example of the configuration outline of transfer-type ink jet printing apparatus 100 of the present embodiment. This printing apparatus is a sheet-fed ink jet printing apparatus producing a printed article by transferring an ink image to printing medium 108 via transfer body 101. In the present embodiment, the X direction, the Y direction and the Z direction refer to the width direction (lengthwise direction), the depth direction and the height direction, respectively, of the ink jet printing apparatus 100. The printing medium 108 is conveyed in the X direction.

As illustrated in FIG. 2, the transfer-type ink jet printing apparatus 100 of the present invention has: transfer body 101 supported by support member 102; reaction solution application apparatus 103 which applies a reaction solution that reacts with color ink onto the transfer body 101; ink application apparatus 104 including an ink jet head which applies color ink onto the transfer body 101 provided with the reaction solution, to form an ink image which is an image formed by the ink, on the transfer body; liquid absorption apparatus 105 which absorbs a liquid component from the ink image on the transfer body; and pressing member 106 for transfer which transfers the liquid component-removed ink image on the transfer body onto printing medium 108 such as paper. The transfer-type ink jet printing apparatus 100 may have, if necessary, transfer body cleaning member 109 which cleans the surface of the transfer body 101 after transfer. As a matter of course, the transfer body 101, the reaction solution application apparatus 103, the ink jet head of the ink application apparatus 104, the liquid absorption apparatus 105 and the transfer body cleaning member 109 each have a length sufficiently adaptable to the printing medium 108 used, in the Y direction.

The transfer body 101 rotates around rotational axis 102a of the support member 102 in a direction indicated by arrow A of FIG. 2. The transfer body 101 moves by this rotation of the support member 102. A reaction solution and ink are sequentially applied onto the moving transfer body 101 by the reaction solution application apparatus 103 and the ink application apparatus 104, respectively, to form an ink image on the transfer body 101. The ink image formed on the transfer body 101 is allowed, by the movement of the transfer body 101, to move to a position at which the ink image comes into contact with the liquid absorbing member 105a of the liquid absorption apparatus 105. The liquid absorbing member 105a has the porous body according to the present invention, and the porous body is disposed so as to come into contact with the ink image.

The transfer body 101 and the liquid absorption apparatus 105 move in synchronization with the rotation of the transfer body 101. The ink image formed on the transfer body 101 undergoes contact with the liquid absorbing member 105a which is moving in a direction indicated by arrow B of FIG. 2. During this contact, the liquid absorbing member 105a removes a liquid component from the ink image on the transfer body. In this contacted state, particularly, the liquid absorbing member 105a is preferably pressed with predetermined pressing force against the transfer body 101 to thereby allow the liquid absorbing member 105a to function effectively.

The removal of the liquid component can be expressed from a different point of view as concentrating the ink constituting the ink image formed on the transfer body. Concentrating the ink means that the proportion of solid content, such as coloring material or a resin, contained in the ink increases owing to reduction in the liquid component.

Then, the liquid component-removed ink image after the liquid removal becomes an ink-concentrated state as compared with the ink image before the liquid removal and is further allowed by the transfer body 101 to move to transfer part in contact with printing medium 108 conveyed in a direction indicated by arrow C of FIG. 2 by printing medium conveyance device 107. While the ink image after the liquid removal is in contact with the printing medium 108, the pressing member 106 for transfer presses the transfer body 101 so that the ink image is transferred onto the printing medium 108. The ink image thus transferred onto the printing medium 108 is a reverse image of the ink image before the liquid removal and the ink image after the liquid removal.

In the present embodiment, the reaction solution unreacted with ink remains in a non-image region where no ink image is formed, because an ink image is formed on the transfer body after application of the reaction solution and then the ink. In this apparatus, the liquid absorbing member 105a removes a liquid component of the reaction solution not only from the ink image but from the unreacted reaction solution by contact.

Thus, the phrase "liquid component is removed from the ink image" described above does not restrictively mean that the liquid component is removed only from the ink image, and is used to mean that the liquid component can be removed at least from the ink image on the transfer body.

The liquid component is not particularly limited as long as the liquid component has fluidity and has an almost constant volume without having a given shape.

Examples of the liquid component include water and an organic solvent contained in the ink or the reaction solution.

Each configuration of the transfer-type ink jet printing apparatus of the present embodiment will be described below.

<Transfer Body>

The transfer body 101 has a surface layer including an ink image forming face. Various materials such as resins and ceramics can be appropriately used as a material of the surface layer, and a material having a high compressive modulus of elasticity is preferably used in terms of durability and the like. Specific examples thereof include acrylic resin, acrylic silicone resin, fluorine-containing resin, and condensates obtained by condensing a hydrolyzable organo-silicon compound. The material used may be surface-treated in order to improve the wettability of the reaction solution, transferability and the like. Examples of the surface treatment include frame treatment, corona treatment, plasma treatment, polishing treatment, roughening treatment, active energy line irradiation treatment, ozone treatment, surfactant treatment and silane coupling treatment. A plurality of these treatments may be combined. Also, the surface layer may be provided with an arbitrary surface shape.

The transfer body also preferably has a compressive layer having a function of absorbing pressure fluctuation. The compressive layer thus established can absorb deformation, disperse local pressure fluctuation, and maintain favorable transferability even at the time of high-speed printing. Examples of the material of the compressive layer include acrylonitrile-butadiene rubber, acrylic rubber, chloroprene rubber, urethane rubber and silicone rubber. The rubber material, when molded, can be mixed with a predetermined amount of a vulcanizing agent, a vulcanization accelerator or the like and further mixed, if necessary, with a foaming agent or a filler such as a hollow fine particle or common salt, and the resulting porous material is preferably used. As a result, an air bubble portion is compressed with volume change against various pressure fluctuations. Therefore, the porous material is less deformable in a direction other than the direction of the compression. Hence, more stable transferability and durability can be obtained. The porous rubber material has a continuous pore structure where pores continue to each other, and an independent pore structure where pores are independent from each other. In the present invention, any of the structures can be used, and these structures may be used in combination.

It is prefer that the transfer body further have an elastic layer between the surface layer and the compressive layer. Various materials such as resins and ceramics can be appropriately used as a material of the elastic layer. Various elastomer materials or rubber materials is preferably used in terms of processing characteristics and the like. Specific examples thereof include fluorosilicone rubber, phenyl silicone rubber, fluorine-containing rubber, chloroprene rubber, urethane rubber, nitrile rubber, ethylene propylene rubber, natural rubber, styrene rubber, isoprene rubber, butadiene rubber, ethylene/propylene/butadiene copolymers and nitrile butadiene rubber. Particularly, silicone rubber, fluorosilicone rubber and phenyl silicone rubber is preferably used in terms of dimensional stability and durability because of its small compression set. These rubbers also is preferably used in terms of transferability because of its small modulus of elasticity caused by temperature.

Various adhesives or double-faced tapes may be used for fixing or holding each layer (surface layer, elastic layer and compressive layer) constituting the transfer body, between these layers. Also, a reinforcement layer having a high compressive modulus of elasticity may be established in order to suppress lateral extension or keep strength in installing the transfer body in the apparatus. Alternatively, a woven fabric may be used as the reinforcement layer. The transfer body can be prepared by arbitrarily combining layers made of the materials described above.

The size of the transfer body can be arbitrarily selected according to the printing image size of interest. Examples of the shape of the transfer body specifically include, but are not particularly limited to, sheet, roller, belt and endless web shapes.

<Support Member>

The transfer body 101 is supported on support member 102. Various adhesives or double-faced tapes may be used in a method for supporting the transfer body. Alternatively, a member for installation made of a material such as a metal, a ceramic or a resin may be attached to the transfer body and thereby used to support the transfer body on the support member 102.

The support member 102 is required to have structural strength to some extent from the viewpoint of its conveyance accuracy and durability. A metal, a ceramic, a resin or the like is preferably used as a material of the support member. Particularly, aluminum, iron, stainless, acetal resin, epoxy resin, polyimide, polyethylene, polyethylene terephthalate, nylon, polyurethane, silica ceramic or alumina ceramic is preferably used for reducing inertia under operating conditions and improving the response of control, in addition to rigidity and dimension accuracy that can resist pressurization at the time of transfer. Alternatively, these materials may be used in combination.

<Reaction Solution Application Apparatus>

The ink jet printing apparatus of the present embodiment has reaction solution application apparatus 103 which applies a reaction solution to the transfer body 101. The reaction solution can reduce the partial fluidity of the ink and/or the ink composition on the ink receiving medium by contact with the ink and suppress bleeding or beading during image formation by the ink. Specifically, a reactant (also referred to as an ink viscosity increasing component) contained in the reaction solution chemically reacts with or physically adsorbs a coloring material, a resin, or the like serving as a portion of the composition constituting the ink, by contact therewith. This can elevate the viscosity of the whole ink, or local viscosity by the partial agglomeration of ink-constituting component such as a coloring material and reduce the partial fluidity of the ink and/or the ink composition. The reaction solution application apparatus 103 of FIG. 2 is illustrated as a gravure offset roller having reaction solution reservoir 103a which accommodates the reaction solution, and reaction solution applying members 103b and 103c which apply the reaction solution in the reaction solution reservoir 103a onto the transfer body 101.

The reaction solution application apparatus may be any apparatus that can apply the reaction solution onto the ink receiving medium, and various apparatuses conventionally known can be appropriately used. Specific examples thereof include gravure offset rollers, ink jet heads, die coating apparatuses (die coaters) and blade coating apparatuses (blade coaters). The application of the reaction solution by the reaction solution application apparatus may be performed before or after application of ink as long as the reaction solution can be mixed (reacted) with the ink on the ink receiving medium. Preferably, the reaction solution is applied before application of ink. The application of the reaction solution before application of ink can also suppress bleeding (mingling of adjacently applied ink droplets) and beading (attraction of an ink droplet landed first to an ink droplet landed later) during image printing based on an ink jet system.

<Reaction Solution>

Hereinafter, each component constituting the reaction solution that is applied to the present embodiment will be described in detail.

(Reactant)

The reaction solution allows an anionic group-containing component (a resin, a self-dispersible pigment and the like) in ink to agglomerate by contact with the ink, and contains a reactant. Examples of the reactant can include cationic components such as polyvalent metal ions and cationic resins, and organic acids.

Examples of the polyvalent metal ion include: divalent metal ions such as $Ca^{2+}$, $Cu^{2+}$, $Ni^{2+}$, $Mg^{2+}$, $Sr^{2+}$, $Ba^{2+}$ and $Zn^{2+}$; and trivalent metal ions such as $Fe^{3+}$, $Cr^{3+}$, $Y^{3+}$ and $Al^{3+}$. A polyvalent metal salt (which may be a hydrate) constituted by the bonding of the polyvalent metal ion to an anion can be used for allowing the reaction solution to contain the polyvalent metal ion. Examples of the anion can include: inorganic anions such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions such as $HCOO^-$, $(COO^-)_2$, $COOH(COO^-)$, $CH_3COO^-$, $C_2H_4(COO^-)_2$, $C_6H_5COO^-$, $C_6H_4(COO^-)_2$ and $CH_3SO_3^-$. In the case of using the polyvalent metal ion as the reactant, the content (% by mass) thereof based on a polyvalent metal salt in the reaction solution is preferably 1.00% by mass or more to 20.00% by mass or less with respect to the total mass of the reaction solution.

The reaction solution containing the organic acid has buffering ability in an acidic region (less than pH 7.0, preferably pH 2.0 to 5.0) and thereby renders the anionic group of the ink component acidic for agglomeration. Examples of the organic acid can include: monocarboxylic acids such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumarinic acid, and salts thereof; dicarboxylic acids such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids such as citric acid and trimellitic acid, and salts and hydrogen salts thereof; and tetracarboxylic acids such as pyromellitic acid, and salts and hydrogen salts thereof. The content (% by mass) of the organic acid in the reaction solution is preferably 1.00% by mass or more to 50.00% by mass or less.

Examples of the cationic resin can include resins having primary to tertiary amine structures and resins having a quaternary ammonium salt structure. Specific examples thereof can include resins having a vinylamine, allylamine, vinylimidazole, vinylpyridine, dimethylaminoethyl methacrylate, ethyleneimine or guanidine structure. The cationic resin may be used in combination with an acidic compound or may be subjected to quaternarization treatment in order to enhance solubility in the reaction solution. In the case of using the cationic resin as the reactant, the content (% by mass) of the cationic resin in the reaction solution is preferably 1.00% by mass or more to 10.00% by mass or less with respect to the total mass of the reaction solution.

(Component Other than Reactant)

An aqueous medium mentioned later, other additives and the like that can be used in ink can be similarly used as components other than the reactant.

<Ink Application Apparatus>

The ink jet printing apparatus of the present embodiment has ink application apparatus 104 which applies ink to the transfer body 101. On the transfer body, the reaction solution and ink are mixed so that an ink image is formed by the reaction solution and the ink. Then, a liquid component is absorbed from the ink image by the liquid absorption apparatus 105.

In the present embodiment, ink jet head is used as the ink application apparatus which applies ink. Examples of the ink jet head include a form that discharges ink by forming air bubbles resulting from film boiling in ink using a thermoelectric converter, a form that discharges ink through an electromechanical converter, and a form that discharges ink by utilizing static electricity. In the present embodiment, an ink jet head known in the art can be used. Particularly, a form utilizing a thermoelectric converter is suitably used from the viewpoint of high-speed and high-density printing. In drawing, ink is applied in a necessary amount to each position in response to image signals.

In the present embodiment, the ink jet head is a full-line head that runs in the Y direction, and nozzles are arranged in a range that covers the width of an image printing region of a printing medium having the maximum possible size. The ink jet head has, on its underside (transfer body 101 side), an ink discharging face where the nozzles are open. The ink discharging face faces the surface of the transfer body 101 via a very small space (approximately several mm).

The amount of the ink applied can be expressed as an image data density value, ink thickness and the like. In the present embodiment, the amount of the ink applied ($g/m^2$) is defined as an average value determined by multiplying the mass of each ink dot by the number of ink dots applied and dividing the resulting value by a printing area. The maximum amount of the ink applied in an image region refers to the amount of the ink applied to an area of at least 5 $mm^2$ or more within a region used as information on an ink receiving medium, from the viewpoint of removing a liquid component in the ink.

The ink application apparatus 104 may have a plurality of ink jet heads in order to apply each color ink onto the ink receiving medium. In the case of forming respective color images using, for example, yellow ink, magenta ink, cyan ink and black ink, the ink application apparatus has four ink jet heads which respectively discharge these four ink types onto the ink receiving medium, and these ink jet heads are arranged in the X direction.

The ink application apparatus may also include an ink jet head which discharges substantially clear, colorless ink free from a coloring material or containing a coloring material at a very low proportion. This clear ink can be used for forming an ink image together with the reaction solution and color ink. For example, this clear ink can be used for improving the gross of an image. A resin component to be contained therein can be appropriately adjusted so as to create the gross of an image after transfer. In addition, the discharge position of the clear ink can be controlled. Since it is more desirable that this clear ink should be positioned closer to the surface layer than color ink in a final printed article, the transfer-type printing apparatus is configured such that the clear ink is applied onto the transfer body 101 before the color ink. Therefore, the ink jet head for the clear ink can be disposed upstream of the ink jet head for the color ink in the moving direction of the transfer body 101 which faces the ink application apparatus 104.

Aside from the gross purpose, the clear ink can be used for improving the ink image transferability from the transfer body 101 to a printing medium. For example, clear ink richer in a component that exerts adhesiveness than color ink can be applied to color ink and thereby used as a transferability improving liquid that is applied onto the transfer body 101. For example, the ink jet head for the clear ink for improvement in transferability is disposed downstream of the ink jet head for the color ink in the moving direction of the transfer body 101 which faces the ink application apparatus 104. The clear ink is located on the uppermost surface of an ink image by applying the color ink onto the transfer body 101 and then applying the clear ink onto the transfer body thus provided with the color ink. In the transfer of an ink image to a printing medium by the transfer part, the clear ink on the surface of the ink image adheres to the printing medium 108 with adhesive force to some extent. This facilitates the movement of the ink image after liquid removal to the printing medium 108.

<Ink>

Hereinafter, each component constituting the ink that is applied to the present embodiment will be described in detail.

(Coloring Material)

A pigment or a dye can be used as the coloring material. The content of the coloring material in the ink is preferably 0.5% by mass or more to 15.0% by mass or less, more preferably 1.0% by mass or more to 10.0% by mass or less, with respect to the total mass of the ink.

Specific examples of the pigment can include: inorganic pigments such as carbon black and titanium oxide; and organic pigments such as azo, phthalocyanine, quinacridon, isoindolinone, imidazolone, diketopyrrolopyrrole and dioxazine pigments.

For example, a resin-dispersed pigment with a resin as a dispersant, or a self-dispersible pigment containing a hydrophilic group bonded to the particle surface of the pigment can be used in a pigment dispersion system. Also, for example, a resin-bonded pigment containing a resin-containing organic group chemically bonded to the particle surface of the pigment, or a microcapsule pigment with the particle surface of the pigment coated with a resin or the like can be used.

A resin dispersant capable of dispersing the pigment into an aqueous medium by the action of an anionic group is preferably used as the resin dispersant for dispersing the pigment into the aqueous medium. A resin as mentioned later can be suitably used as the resin dispersant. A water-soluble resin can be more suitably used. The content (% by mass) of the pigment is preferably 0.3 or more times to 10.0 or less times in terms of mass ratio to the content of the resin dispersant (pigment/resin dispersant).

A pigment containing an anionic group such as a carboxylic acid group, a sulfonic acid group or a phosphonic acid group bonded directly or via an additional atomic group (—R—) to the particle surface can be used as the self-dispersible pigment. The anionic group can be any of acid and salt types. The salt-type anionic group can be in any of a partially dissociated state and a wholly dissociated state. Examples of the cation serving as a counterion for the salt-type anionic group can include: alkali metal cations; ammonium cations; and organic ammonium cations. Specific examples of the additional atomic group (—R—) can include: linear or branched alkylene groups having 1 to 12 carbon atoms; arylene groups such as a phenylene group and a naphthylene group; carbonyl groups; imino groups; amide groups; sulfonyl groups; ester groups; and ether groups. A group containing these groups in combination may be used.

A dye having an anionic group is preferably used as the dye. Specific examples of the dye can include azo, triphenylmethane, (aza)phthalocyanine, xanthene and anthrapyridone dyes.

(Resin)

The ink can contain a resin. The content (% by mass) of the resin in the ink is preferably 0.1% by mass or more to 20.0% by mass or less, more preferably 0.5% by mass or more to 15.0% by mass or less, with respect to the total mass of the ink.

The resin can be added to the ink for reasons such as (i) the stabilization of the dispersed state of the pigment, i.e., the resin dispersant mentioned above or assistance thereof, and (ii) improvement in various characteristics of an image to be printed. Examples of the form of the resin can include block copolymers, random copolymers, graft copolymers and combinations thereof. Also, the resin may be in a state dissolved as a water-soluble resin in an aqueous medium or may be in a state dispersed as a resin particle in an aqueous medium. The resin particle does not have to enclose the coloring material.

In the present invention, the term "water-soluble" as to a resin means that a particle having a particle size measurable by a dynamic light scattering method is not formed when the resin is neutralized with an alkali equivalent to its acid number. Whether or not a resin is water-soluble can be determined according to a method given below. First, a liquid (resin solid matter: 10% by mass) containing a resin neutralized with an alkali (sodium hydroxide, potassium hydroxide and the like) equivalent to the acid number is provided. Subsequently, the provided liquid is diluted 10-fold (based on volume) with pure water to prepare a sample solution. Then, the particle size of the resin in the sample solution is measured by the dynamic light scattering method. In this case, the resin can be considered water-soluble when a particle having a particle size is not measured. The conditions for this measurement can be set to, for example, Set Zero: 30 seconds, the number of measurements: 3 and measurement time: 180 seconds. For example, a particle size analyzer (e.g., trade name "UPA-EX150", manufactured by Nikkiso Co., Ltd.) based on the dynamic light scattering method can be used as a particle size distribution measurement apparatus. As a matter of course, the particle size distribution measurement apparatus, the measurement conditions and the like used are not limited to those described above.

The acid number of the resin is preferably 100 mgKOH/g or more to 250 mgKOH/g or less for a water-soluble resin and is preferably 5 mgKOH/g or more to 100 mgKOH/g or less for a resin particle. The weight-average molecular weight of the resin is preferably 3,000 or more to 15,000 or less for a water-soluble resin and is preferably 1,000 or more to 2,000,000 or less for a resin particle. The volume-average particle size of the resin particle measured by the dynamic light scattering method (the measurement conditions are the same as above) can be 100 nm or more to 500 nm or less.

Examples of the resin can include acrylic resin, urethane resin and olefin resin. Particularly, acrylic resin or urethane resin is preferably used.

A resin having a hydrophilic unit and a hydrophobic unit as constitutional units is preferably used as the acrylic resin. Among others, a resin having a hydrophilic unit derived from (meth)acrylic acid and a hydrophobic unit derived from at least one of a monomer having an aromatic ring and a (meth)acrylic acid ester monomer is preferably used. Particularly, a resin having a hydrophilic unit derived from (meth)acrylic acid and a hydrophobic unit derived from at least one of styrene and α-methylstyrene monomers is preferably used. These resins interact easily with the pigment and can therefore be suitably used as the resin dispersant for dispersing the pigment.

The hydrophilic unit is a unit having a hydrophilic group such as an anionic group. The hydrophilic unit can be formed, for example, by polymerizing a hydrophilic monomer having a hydrophilic group. Specific examples of the hydrophilic monomer having a hydrophilic group can include acidic monomers having a carboxylic acid group such as a (meth)acrylic acid, itaconic acid, maleic acid or fumaric acid group, and anionic monomers such as anhydrides or salts of these acidic monomers. Examples of the cation constituting the salt of the acidic monomer can include ions such as lithium, sodium, potassium, ammonium and organic ammonium ions. The hydrophobic unit is a unit lacking a hydrophilic group such as an anionic group. The hydrophobic unit can be formed, for example, by polymerizing a hydrophobic monomer lacking a hydrophilic group such as an anionic group. Specific examples of the hydrophobic monomer can include: monomers having an aromatic ring, such as styrene, α-methylstyrene and benzyl (meth)acrylate; and (meth)acrylic acid ester monomers such as methyl (meth)acrylate, butyl (meth)acrylate and 2-ethylhexyl (meth)acrylate.

The urethane resin can be obtained, for example, by reacting polyisocyanate with polyol. Alternatively, the urethane resin may be obtained through further reaction with a chain extender. Examples of the olefin resin can include polyethylene and polypropylene.

(Aqueous Medium)

The ink can contain an aqueous medium which is water or a mixed solvent of water and a water-soluble organic solvent. Deionized water or ion-exchange water is preferably used as the water. The content (% by mass) of the water in the ink is preferably 50.0% by mass or more to 95.0% by mass or less with respect to the total mass of the ink. The content (% by mass) of the water-soluble organic solvent in the ink is preferably 3.0% by mass or more to 50.0% by mass or less with respect to the total mass of the ink. Any of alcohols, (poly)alkylene glycols, glycol ethers, nitrogen-containing compounds and sulfur-containing compounds and the like usable in ink jet ink can be used as the water-soluble organic solvent.

(Other Additives)

The ink may contain various additives such as an antifoaming agent, a surfactant, a pH adjuster, a viscosity adjuster, a rust inhibitor, an antiseptic, a mold inhibitor, an antioxidant and a reduction inhibitor, if necessary, in addition to the components described above.

<Liquid Absorption Apparatus>

In the present embodiment, the liquid absorption apparatus 105 has liquid absorbing member 105a and pressing member 105b for liquid absorption which presses the liquid absorbing member 105a against an ink image on the transfer body 101. The shapes of the liquid absorbing member 105a and the pressing member 105b are not particularly limited. For example, as illustrated in FIG. 2, this apparatus can have pressing member 105b having a columnar shape and liquid absorbing member 105a having a belt shape and is configured such that the columnar-shaped pressing member 105b presses the belt-shaped liquid absorbing member 105a against the transfer body 101. Alternatively, the apparatus may have pressing member 105b having a columnar shape and liquid absorbing member 105a having a cylindrical shape formed on the peripheral surface of the columnar-shaped pressing member 105b and is configured such that the columnar-shaped pressing member 105b presses the cylindrical-shaped liquid absorbing member 105a against the transfer body.

In the present embodiment, the liquid absorbing member 105a preferably has a belt shape in consideration of space within the ink jet printing apparatus and the like.

The liquid absorption apparatus 105 having such a belt-shaped liquid absorbing member 105a may have a tension member which tensions the liquid absorbing member 105a. In FIG. 2, reference numeral 105c denotes a tension roller as the tension member. In FIG. 2, the pressing member 105b is illustrated as a roller member that rotates, as in the tension roller, but is not limited thereto.

In the liquid absorption apparatus 105, the liquid absorbing member 105a having a porous body of the present invention is pressed in contact with the ink image by the pressing member 105b so that a liquid component contained in the ink image is absorbed to the liquid absorbing member 105a to decrease the amount of the liquid component. In addition to this system of bringing the liquid absorbing member in contact, various other approaches conventionally used, for example, a method based on heating, a method of blowing low humid air and a method of reducing pressure may be combined as a method for decreasing the amount of the liquid component in the ink image. Alternatively, the amount of the liquid component may be further decreased by applying these methods to the ink image having a decreased amount of the liquid component after the liquid removal.

<Liquid Absorbing Member>

In the present embodiment, at least a portion of a liquid component is removed from the ink image before liquid removal by absorption in contact with the liquid absorbing member having a porous body of the present invention to decrease the content of the liquid component in the ink image. When a contact face of the liquid absorbing member for the ink image is defined as a first face, the porous body of the present invention is disposed on the first face. The liquid absorbing member having such a porous body of the present invention preferably has a shape capable of absorbing a liquid by circulation which involves moving in tandem with the movement of an ink receiving medium, coming into contact with the ink image, and then coming into contact again with another ink image before liquid removal at a predetermined cycle. Examples of the shape include endless belt and drum shapes.

Hereinafter, various conditions and configurations of the liquid absorption apparatus 105 will be described in detail.

(Pretreatment)

In the present embodiment, the liquid absorbing member 105a having a porous body of the present invention is preferably pretreated by a pretreatment unit (not shown in FIGS. 2 and 5) which applies a treatment solution to the liquid absorbing member before contact with an ink image. The treatment solution used in the present embodiment preferably contains water and a water-soluble organic solvent. The water is preferably water deionized by ion exchange or the like. The type of the water-soluble organic solvent is not particularly limited, and any organic solvent known in the art, such as ethanol or isopropyl alcohol is preferably used. In the pretreatment of the liquid absorbing member used in the present embodiment, the application method is not particularly limited, and dipping or dropwise addition of liquid droplets is preferably used.

(Pressurization Condition)

The pressure of the liquid absorbing member upon contact with an ink image on the transfer body is preferably 2.9 N/cm$^2$ (0.3 kgf/cm$^2$) or more because the solid-liquid separation of a liquid component in the ink image can be achieved in a shorter time and the liquid component can be removed from the ink image. In the present specification, the pressure of the liquid absorbing member refers to the nip pressure between an ink receiving medium and the liquid absorbing member and is a value calculated by performing surface pressure measurement using a surface pressure distribution sensor (trade name: "I-SCAN", manufactured by Nitta Corp.) and dividing a load in a pressurization region by an area.

(Duration of Action)

The duration of action for the contact of the liquid absorbing member 105a with an ink image is preferably 50 ms or less in order to further suppress the adhesion of the coloring material in the ink image to the liquid absorbing member. In the present specification, the duration of action is calculated by dividing a pressure sensing width in the moving direction of the ink receiving member by the movement speed of the ink receiving member, in the surface pressure measurement mentioned above. Hereinafter, this duration of action is referred to as a liquid absorption nip time.

In this way, an ink image with the amount of the liquid component decreased by absorbing the liquid component is formed on the transfer body 101. This ink image after the liquid removal is then transferred onto printing medium 108 in transfer part 111. The apparatus configuration and conditions for the transfer will be described.

<Pressing Member for Transfer>

In the present embodiment, the ink image after liquid component removal on the transfer body 101 is brought by pressing member 106 for transfer into contact with printing medium 108 conveyed by printing medium conveyance unit 107 and thereby transferred onto the printing medium 108. After removal of a liquid component contained in the ink image on the transfer body 101, the ink image can be transferred to the printing medium 108 to thereby obtain a printing image with curl, cockling and the like suppressed.

The pressing member 106 is required to have structural strength to some extent from the viewpoint of printing medium 108 conveyance accuracy and durability. A metal, a ceramic, a resin or the like is preferably used as a material of the pressing member 106. Particularly, aluminum, iron, stainless, acetal resin, epoxy resin, polyimide, polyethylene, polyethylene terephthalate, nylon, polyurethane, silica ceramic or alumina ceramic is preferably used for reducing inertia under operating conditions and improving the response of control, in addition to rigidity and dimension accuracy that can resist pressurization at the time of transfer. Alternatively, these materials may be used in combination.

The pressing time for pressing the transfer body by the pressing member 106 in order to transfer the ink image after liquid removal on the transfer body 101 to the printing medium 108 is not particularly limited, but the pressing time is preferably 5 ms or more to 100 ms or less in order to favorably perform the transfer without impairing the durability of the transfer body. The pressing time according to the present embodiment refers to a time for which the printing medium 108 and the transfer body 101 are in contact with each other and is a value calculated by performing surface pressure measurement using a surface pressure distribution sensor (trade name: "I-SCAN", manufactured by Nitta Corp.) and dividing the length in the conveyance direction of a pressurization region by a conveyance speed.

The pressure for pressing the transfer body 101 by the pressing member 106 in order to transfer the ink image after liquid removal on the transfer body 101 to the printing medium 108 is not particularly limited and is intended to favorably perform the transfer without impairing the durability of the transfer body. For this purpose, the pressure is preferably 9.8 N/cm$^2$ (1 kgf/cm$^2$) or more to 294.2 N/cm$^2$ (30 kgf/cm$^2$) or less. The pressure according to the present embodiment refers to the nip pressure between the printing medium 108 and the transfer body 101 and is a value calculated by performing surface pressure measurement using a surface pressure distribution sensor and dividing a load in a pressurization region by an area.

The temperature at the time of pressing the transfer body 101 by the pressing member 106 in order to transfer the ink image after liquid removal on the transfer body 101 to the printing medium 108 is not particularly limited, but the temperature is preferably equal to or higher than the glass transition point or the softening point of the resin component contained in the ink. A form including heating units which heat the ink image after liquid removal on the transfer body 101, the transfer body 101 and the printing medium 108 is preferably used for heating.

Examples of the shape of the pressing member 106 include, but are not particularly limited to, a roller shape.

<Printing Medium and Printing Medium Conveyance Apparatus>

In the present embodiment, the printing medium 108 is not particularly limited, and any printing medium known in the art can be used. Examples of the printing medium include long materials wound into a roll shape and sheets cut into a predetermined dimension. Examples of the material include paper, plastic films, wooden boards, cardboards and metal films.

In FIG. 2, the printing medium conveyance device 107 for conveying the printing medium 108 is constituted by printing medium feeding roller 107a and printing medium winding roller 107b. However, the printing medium conveyance device 107 is not particularly limited by this configuration as long as the printing medium conveyance device 107 can convey the printing medium.

<Control System>

Figure 3:
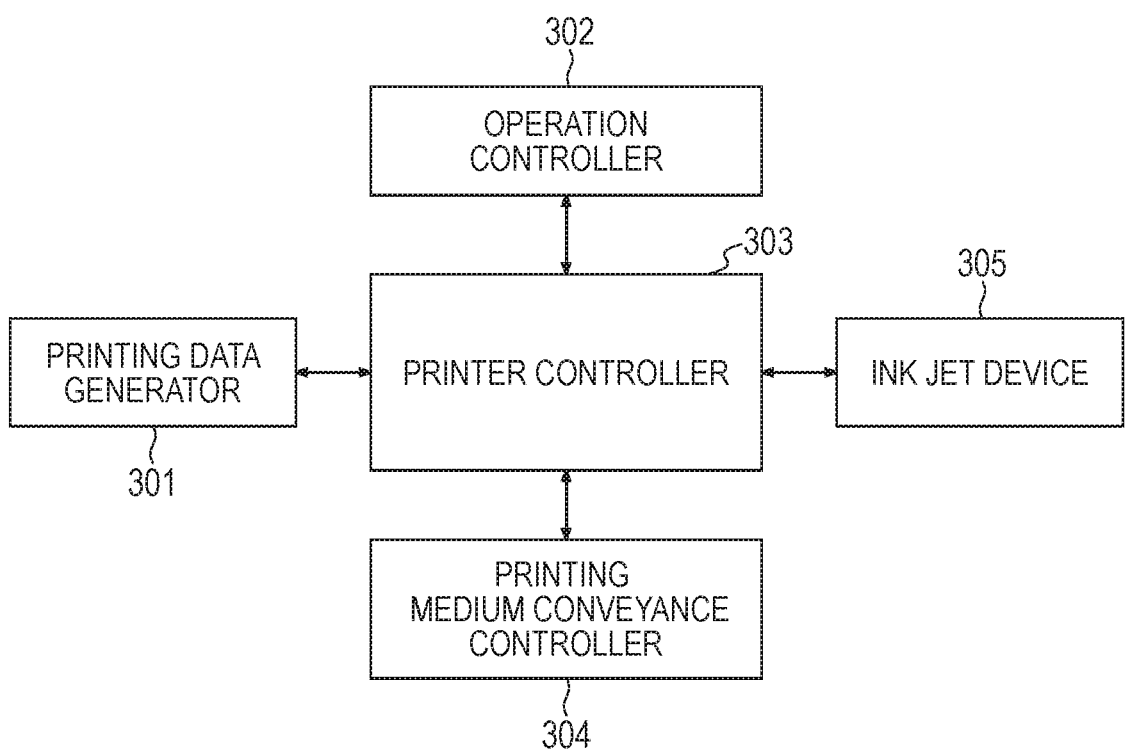
FIG. 3 is a block diagram illustrating a control system of the whole apparatus for the ink jet printing apparatus illustrated in FIG. 2 or 5.

The transfer-type ink jet printing apparatus according to the present embodiment has a control system which controls each apparatus. FIG. 3 is a block diagram illustrating a control system of the whole apparatus for the transfer-type ink jet printing apparatus illustrated in FIG. 2.

In FIG. 3, reference numeral 301 denotes a printing data generator such as an external print server. Reference numeral 302 denotes an operation controller such as an operating panel. Reference numeral 303 denotes a printer controller for executing a printing process. Reference numeral 304 denotes a printing medium conveyance controller for conveying the printing medium. Reference numeral 305 denotes an ink jet device for printing.

Figure 4:
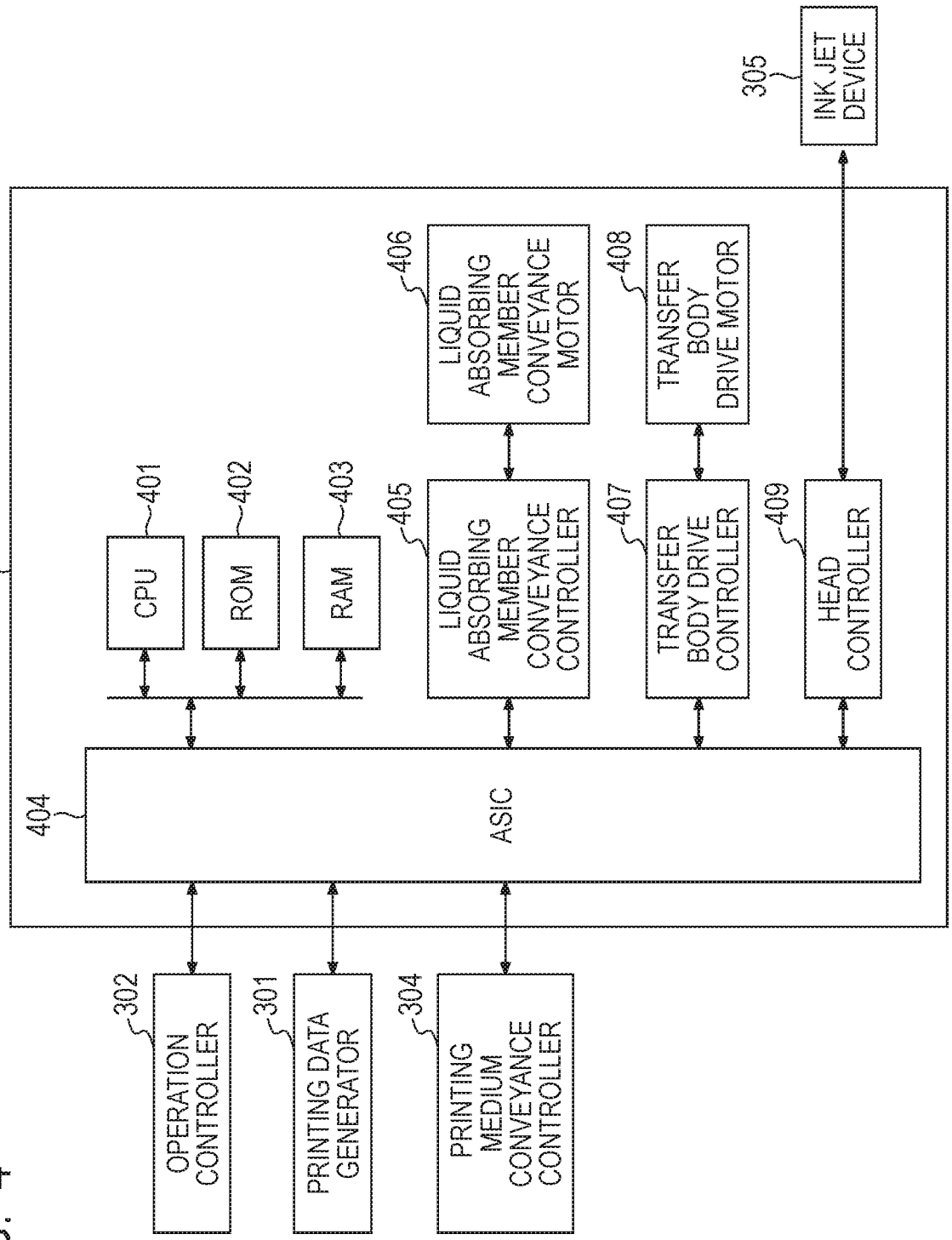
FIG. 4 is a block diagram of a printer controller in the transfer-type ink jet printing apparatus illustrated in FIG. 2.

FIG. 4 is a block diagram of a printer controller in the transfer-type ink jet printing apparatus of FIG. 2.

Reference numeral 401 denotes CPU which controls the whole printer. Reference numeral 402 denotes ROM which stores the control program of the CPU 401. Reference numeral 403 denotes RAM for executing the program. Reference numeral 404 denotes an application specific integrated circuit (ASIC) having an embedded network controller, serial IF controller, controller for head data generation, motor controller and the like. Reference numeral 405 denotes a liquid absorbing member conveyance controller for driving liquid absorbing member conveyance motor 406. The liquid absorbing member conveyance controller is command-controlled from the ASIC 404 via serial IF. Reference numeral 407 denotes a transfer body drive controller for driving transfer body drive motor 408. The transfer body drive controller is also command-controlled from the ASIC 404 via serial IF. Reference numeral 409 denotes a head controller which performs the final discharge data generation, driving voltage generation and the like of the ink jet device 305.

[Direct Drawing-Type Ink Jet Printing Apparatus]

Another example of the present embodiment includes a direct drawing-type ink jet printing apparatus. In the direct drawing-type ink jet printing apparatus, the ink receiving medium is a printing medium on which an image is to be formed.

Figure 5:
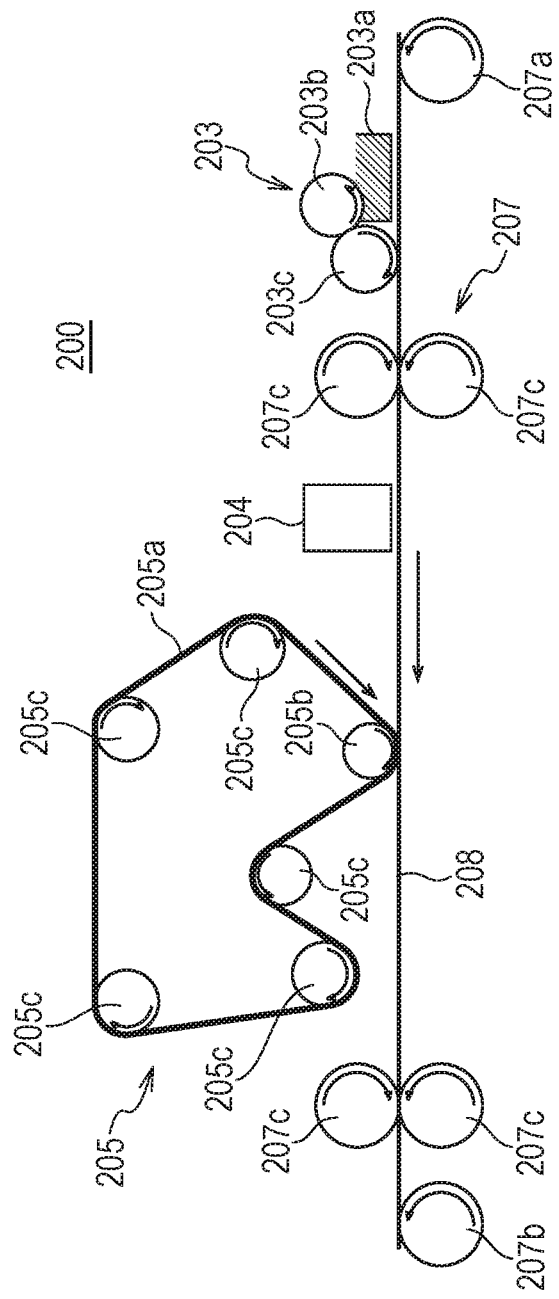
FIG. 5 is a schematic view illustrating one example of the configuration of a direct drawing-type ink jet printing apparatus according to one embodiment of the present invention.

FIG. 5 is a schematic view illustrating one example of the configuration outline of direct drawing-type ink jet printing apparatus 200 according to the present embodiment. The direct drawing-type ink jet printing apparatus compared with the transfer-type ink jet printing apparatus mentioned above is similar in unit to the transfer-type ink jet printing apparatus except that the direct drawing-type ink jet printing apparatus lacks the transfer body 101, the support member 102 and the transfer body cleaning member 109 and forms an image on printing medium 208.

Thus, reaction solution application apparatus 203 which applies a reaction solution to the printing medium 208, ink application apparatus 204 which applies ink to the printing medium 208, and liquid absorption apparatus 205 which absorbs a liquid component contained in an ink image on the printing medium 208 by the contact of liquid absorbing member 205a with the ink image are configurationally similar to those in the transfer-type ink jet printing apparatus, so that the description is omitted.

In the direct drawing-type ink jet printing apparatus of the present embodiment, the liquid absorption apparatus 205 has liquid absorbing member 205a having the porous body according to the present invention and pressing member 205b for liquid absorption which presses the liquid absorbing member 205a against an ink image on the printing medium 208. The shapes of the liquid absorbing member 205a and the pressing member 205b are not particularly limited and can be similar to the shapes of the liquid absorbing member and the pressing member that can be used in the transfer-type ink jet printing apparatus. The liquid absorption apparatus 205 may also have a tension member which tensions the liquid absorbing member. In FIG. 5, reference numeral 205c denotes tension roller as the tension member. The number of tension rollers is not limited to 5 in FIG. 5, and a necessary number of tension rollers can be disposed according to apparatus design. A printing medium support member (not shown) which supports the printing medium from below may be disposed in an ink applying part which applies ink to the printing medium 208 by the ink application apparatus 204, and a liquid component removing part which removes a liquid component by the contact of the liquid absorbing member 205a with an ink image on the printing medium. The reaction solution application apparatus 203 of FIG. 5 is illustrated as a gravure offset roller having reaction solution reservoir 203a which accommodates the reaction solution, and reaction solution applying members 203b and 203c which apply the reaction solution in the reaction solution reservoir 203a onto the printing medium 208.

<Printing Medium Conveyance Device>

In the direct drawing-type ink jet printing apparatus of the present embodiment, printing medium conveyance device 207 is not particularly limited, and a conveyance unit in a direct drawing-type ink jet printing apparatus known in the art can be used. Examples thereof include a printing medium conveyance device having printing medium feeding roller 207a, printing medium winding roller 207b and printing medium conveyance roller 207c, as illustrated in FIG. 5.

<Control System>

The direct drawing-type ink jet printing apparatus according to the present embodiment has a control system which controls each apparatus. A block diagram illustrating a control system of the whole apparatus for the direct drawing-type ink jet printing apparatus illustrated in FIG. 5 is as illustrated in FIG. 3, as in the transfer-type ink jet printing apparatus illustrated in FIG. 2.

Figure 6:
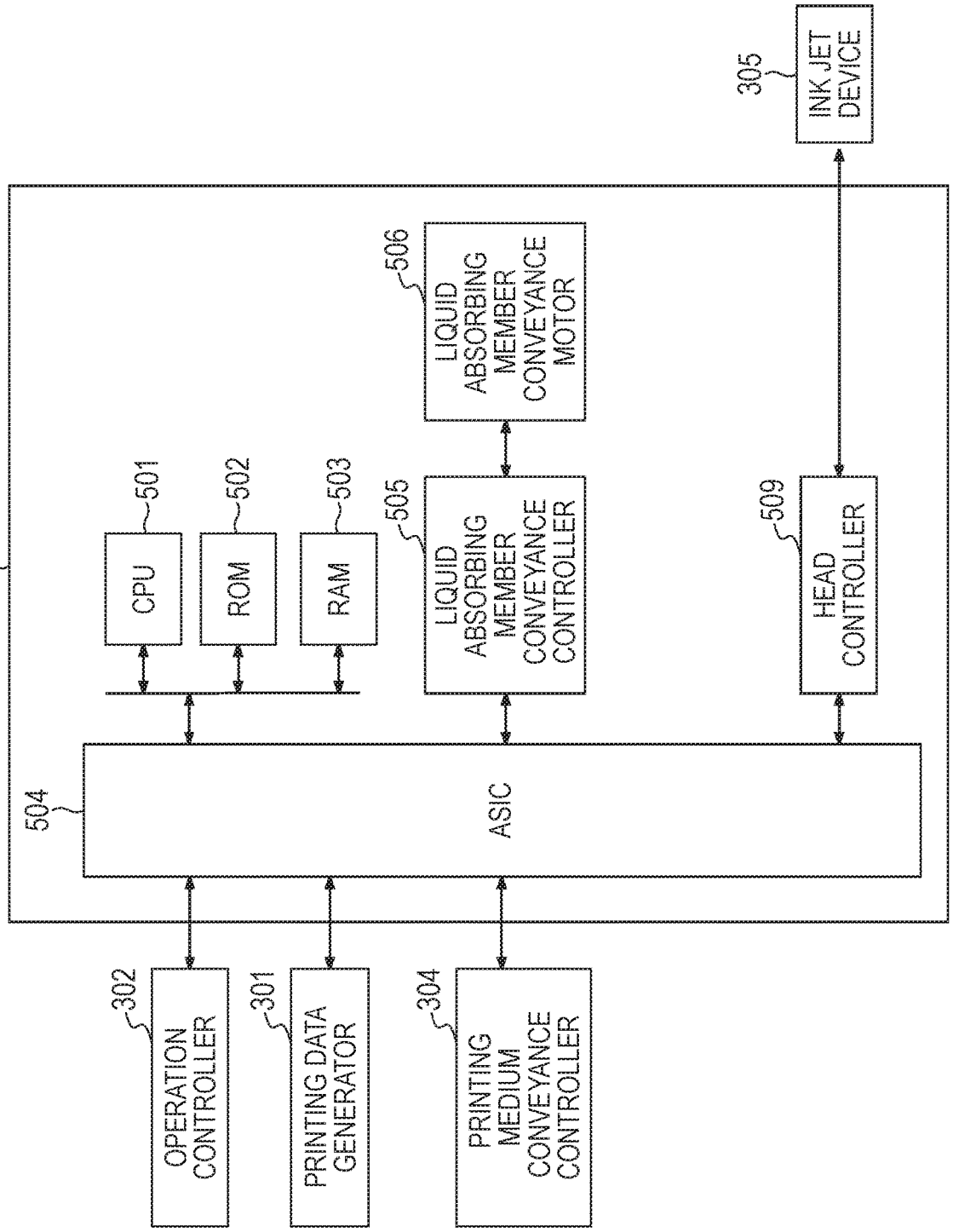
FIG. 6 is a block diagram of a printer controller in the direct drawing-type ink jet printing apparatus illustrated in FIG. 5.

FIG. 6 is a block diagram of a printer controller in the direct drawing-type ink jet printing apparatus of FIG. 5. This block diagram is equivalent to the block diagram of the printer controller in the transfer-type ink jet printing apparatus in FIG. 4 except that the transfer body drive controller 407 and the transfer body drive motor 408 are absent.

Specifically, reference numeral 501 denotes CPU which controls the whole printer. Reference numeral 502 denotes ROM for storing the control program of the CPU. Reference numeral 503 denotes RAM for executing the program. Reference numeral 504 denotes ASIC having an embedded network controller, serial IF controller, controller for head data generation, motor controller and the like. Reference numeral 505 denotes a liquid absorbing member conveyance controller for driving liquid absorbing member conveyance motor 506. The liquid absorbing member conveyance controller is command-controlled from the ASIC 504 via serial IF. Reference numeral 509 denotes a head controller which performs the final discharge data generation, driving voltage generation and the like of the ink jet device 305.

The present invention can provide a porous body that can sufficiently remove a liquid component from an ink image and suppress smeared image, even when repetitively used, and a method for producing the same. The present invention can also provide an ink jet printing method using the porous body and an ink jet printing apparatus including the porous body.

EXAMPLES

Hereinafter, the present embodiment will be described in more detail with reference to Examples and Comparative Examples. The present invention is not limited by Examples described below by any means without departing from the spirit of the present invention. In the description of Examples below, the term "part" is based on mass unless otherwise described. Each physical property of a porous body was measured by a method given below.

(Average Fiber Diameter)

A cross section in the thickness direction was cut out of the porous body. A SEM image of a 100 μm×100 μm region on the cross section was taken using a scanning electron microscope (SEM, trade name: SU-70, manufactured by Hitachi, Ltd.). In this SEM image, clearly identifiable cross sections of the fiber at 20 sites were selected, and the major and minor axes of the cross sections of individual fibers were measured. Then, the major and minor axes were summed and divided by 2, and the obtained value was defined as the fiber diameter of each individual fibers. Average fiber diameter value from the 20 sites was calculated and used as an average fiber diameter. As for the measurement sites, it has been empirically confirmed that the 20 sites thus measured covers substantially every structure.

(Average Pore Size)

A fiber cross section in the SEM image used for measuring the average fiber diameter described above was selected. Binary image processing was performed such that the fiber cross section was divided into resin and void portions. Then, 10 void portions were selected from the binary image thus obtained. Individual areas were determined, and equivalent circle diameters were calculated from the areas. The obtained equivalent circle diameters were defined as individual pore sizes. An average pore size value from the 10 void portions was calculated and used as an average pore size.

(Intra-Fiber Void Ratio)

In the binary image divided into resin and void portions used for measuring the average pore size described above, the total sum of the areas of the resin portions and the total sum of the areas of the void portions were determined. Then, (Total sum of the areas of the void portions)/{(Total sum of the areas of the void portions)+(Total sum of the areas of the resin portions)}×100 was calculated. The same calculation as above was conducted on fiber cross sections at 10 sites, and an average value thereof was calculated and used as an intra-fiber void ratio. In the present invention, % for the intra-fiber void ratio means % by area.

(Inter-Fiber Void Ratio)

The volume of a void between the each fibers was determined from the volume (calculated from a thickness and a sample area) and the mass of the porous body and the density of the fiber to calculate an inter-fiber void ratio. The density was determined by measurement using a densimeter (trade name: MDS-300, manufactured by Alfa Mirage Co., Ltd.). In the present invention, % for the inter-fiber void ratio means % by volume.

Example 1

(Preparation of Porous Body)

A porous body made of a fiber was prepared using the electrospinning apparatus illustrated in FIG. 1. A N,N-dimethylacetamide (DMAc)/tetrahydrofuran (THF) (mass ratio: 5/5) solution containing 25% by mass of polysulfone (PSU) was prepared as a resin solution and loaded in the resin solution supply apparatus 1. A stainless nozzle having an inside diameter of 0.22 mm was used as the nozzle 2. An aluminum collector was used as the collector 4. The distance between the nozzle 2 and the collector 4 was 15 cm. Spinning was performed at voltage in the range of 20 to 30 kV applied from the voltage application apparatus 5. In this operation, the amount of the resin solution supplied was 1 ml/h. The porous body before heat treatment was isolated from the collector 4 and heat-treated at 120° C. in a hot-air dryer to obtain a porous body (porous body after heat treatment) having an average fiber diameter of 1.5 µm and a thickness of 50 µm. The physical properties and the like of the porous body are shown in Table 2.

(Image Formation)

Image formation was performed by the following procedures (1) to (6).

(1) The obtained porous body was dipped in an aqueous solution containing 5% by mass of ethanol, and water was removed by air blow.

(2) A reaction solution mentioned later was applied to a transfer body mentioned later which was an ink receiving medium using a reaction solution application apparatus. The amount of the reaction solution applied was 1 g/m$^2$.

(3) Ink mentioned later was applied to the transfer body provided with the reaction solution using an ink application apparatus to form an ink image before liquid removal. An ink jet head to discharge ink by an on-demand system using a thermoelectric conversion element was used in the ink application apparatus. The amount of the ink applied was 25 g/m$^2$.

(4) A liquid component was removed from the ink image before liquid removal on the transfer body by the contact of the porous body with the ink image at a pressure of 2 kgf/cm$^2$ to form an image.

(5) The liquid component contained in the porous body was removed by air blow.

(6) The steps (2) to (5) were repeated 100 times. The transfer body for use in this repetition of the steps was repetitively used by cleaning after the evaluation of the formed image for image deletion mentioned later.

The reaction solution and the ink used were as follows.

(Preparation of Resin Particle)

A four-neck flask equipped with a stirrer, a reflux condenser and a nitrogen gas inlet was charged with 18.0 parts of butyl methacrylate, 2.0 parts of a polymerization initiator (2,2'-azobis(2-methylbutyronitrile)) and 2.0 parts of n-hexadecane. This reaction system was purged with nitrogen gas and stirred for 0.5 hours. To this flask, 78.0 parts of an aqueous solution containing 6.0% by mass of an emulsifier (trade name: NIKKOL BC15, manufactured by Nikko Chemicals Co., Ltd.) were added dropwise, and the mixture was stirred for 0.5 hours. Subsequently, the mixture was emulsified by ultrasound irradiation for 3 hours in an ultrasound irradiation machine. Then, polymerization reaction was performed at 80° C. for 4 hours in the nitrogen atmosphere. After cooling of the reaction system to 25° C., the components were filtered, and an appropriate amount of pure water was added thereto to prepare an aqueous dispersion of resin particle 1 having a resin particle 1 (solid matter) content of 20.0% by mass.

(Preparation of Aqueous Resin Solution)

A styrene-ethyl acrylate-acrylic acid copolymer (resin 1) having an acid number of 150 mgKOH/g and a weight-average molecular weight of 8,000 was provided. 20.0 parts of the resin 1 were neutralized with potassium hydroxide equimolar to the acid number, and an appropriate amount of pure water was added thereto to prepare an aqueous solution of resin 1 having a resin (solid matter) content of 20.0% by mass.

(Preparation of Reaction Solution)

The components given below were mixed, thoroughly stirred, and then pressure-filtered through a cellulose acetate filter (manufactured by Advantec Co., Ltd.) having a pore size of 3.0 µm to prepare a reaction solution.
Levulinic acid: 40.0 parts
Glycerin: 5.0 parts
Megafac F444: 1.0 part (trade name, surfactant, manufactured by DIC Corp.)
Ion-exchange water: 54.0 parts (Preparation of Pigment Dispersion)

10.0 parts of a pigment (carbon black), 15.0 parts of the aqueous solution of resin 1 and 75.0 parts of pure water were mixed. This mixture and 200 parts of zirconia beads having a diameter of 0.3 mm were added to a batch-type vertical sand mill (manufactured by AIMEX Corp.) and dispersed for 5 hours under water cooling. Then, the dispersion was centrifuged, and coarse particles were removed. The residue was pressure-filtered through a cellulose acetate filter (manufactured by Advantec Co., Ltd.) having a pore size of 3.0 µm to prepare pigment dispersion K having a pigment content of 10.0% by mass and a resin dispersant (resin 1) content of 3.0% by mass.

(Preparation of Ink)

The components shown in Table 1 below were mixed, thoroughly stirred, and then pressure-filtered through a cellulose acetate filter (manufactured by Advantec Co., Ltd.) having a pore size of 3.0 µm to prepare each ink. ACETYLENOL E100 (trade name) is a surfactant manufactured by Kawaken Fine Chemicals Co., Ltd.

TABLE 1

|  | Parts by mass |
| --- | --- |
| Pigment dispersion K | 20.0 |
| Aqueous dispersion of resin particle 1 | 50.0 |
| Aqueous solution of resin 1 | 5.0 |
| Glycerin | 5.0 |
| Diethylene glycol | 7.0 |
| ACETYLENOL E100 | 0.5 |
| Pure water | 12.5 |

(Preparation of Transfer Body)

A PET sheet of 0.5 mm in thickness coated with silicone rubber (KE12 (trade name), manufactured by Shin-Etsu Chemical Co., Ltd.) at a thickness of 0.3 mm was used as the elastic layer of the transfer body. Glycidoxypropyltriethoxysilane and methyltriethoxysilane were mixed at a molar ratio of 1:1 and heated to reflux, and a mixture of the resulting condensate with a photo cation polymerization initiator (SP150 (trade name), manufactured by ADEKA Corp.) was further prepared. The elastic layer surface was subjected to atmospheric pressure plasma treatment so as to attain a contact angle of 10 degrees or less for water. The mixture was applied onto the elastic layer. A film was formed by UV irradiation (high-pressure mercury lamp, integrated light exposure: 5,000 mJ/cm$^2$) and thermal curing (150° C., 2 hr) to prepare transfer body having a surface layer of 0.5 µm in thickness on the elastic body.

(Image Evaluation)

An image on the transfer body obtained after 1, 10, 50 and 100 repetitions of the steps (2) to (5) in the image formation described above was evaluated according to the criteria given below by confirming the amount of the coloring material moved to an image end (image deletion). A smaller amount of the coloring material moved means that a liquid component was more sufficiently removed from the ink image, and the image quality was higher. The results are shown in Table 3.

A: No image deletion was confirmed.
B: Image deletion was slightly confirmed.
C: Image deletion was confirmed.

Example 2

A porous body was prepared in the same way as in Example 1 except that a DMAc/THF (mass ratio: 6/4) solution containing 30% by mass of PSU was used as the resin solution. Image formation was performed in the same way as in Example 1 using the porous body, followed by evaluation. The results are shown in Tables 2 and 3.

Example 3

A porous body was prepared in the same way as in Example 1 except that a DMAc/THF (mass ratio: 7/3) solution containing 30% by mass of PSU was used as the resin solution. Image formation was performed in the same way as in Example 1 using the porous body, followed by evaluation. The results are shown in Tables 2 and 3.

Example 4

A porous body was prepared in the same way as in Example 1 except that a DMAc/THF/N-methyl-2-pyrrolidone (NMP) (mass ratio: 6/3/1) solution containing 25% by mass of PSU was used as the resin solution. Image formation was performed in the same way as in Example 1 using the porous body, followed by evaluation. The results are shown in Tables 2 and 3.

Example 5

A porous body was prepared in the same way as in Example 1 except that a pressure of 3 kg/cm$^2$ was applied during the hot-air drying at 120° C. in the heat treatment. Image formation was performed in the same way as in Example 1 using the porous body, followed by evaluation. The results are shown in Tables 2 and 3.

Example 6

A porous body was prepared in the same way as in Example 1 except that a DMAc solution containing 34% by mass of PSU was used as the resin solution. Image formation was performed in the same way as in Example 1 using the porous body, followed by evaluation. The results are shown in Tables 2 and 3.

Example 7

A porous body was prepared in the same way as in Example 1 except that: a dimethylformamide (DMF) solution containing 12% by mass of polyacrylonitrile (PAN) was used as the resin solution; and in the heat treatment, the temperature of the hot-air drying was set to 100° C., and a pressure of 3 kg/cm$^2$ was applied. Image formation was performed in the same way as in Example 1 using the porous body, followed by evaluation. The results are shown in Tables 2 and 3.

Example 8

A porous body was prepared in the same way as in Example 1 except that: a DMAc/methyl isobutyl ketone (MIBK) (mass ratio: 5/5) solution containing 20% by mass of polyvinylidene fluoride (PVDF) was used as the resin solution; and in the heat treatment, the temperature of the hot-air drying was set to 80° C., and a pressure of 5 kg/cm$^2$ was applied. Image formation was performed in the same way as in Example 1 using the porous body, followed by evaluation. The results are shown in Tables 2 and 3.

Example 9

A porous body was prepared in the same way as in Example 1 except that: spinning was performed using a MIBK solution containing 20% by mass of PVDF as the resin solution and subsequently performed using a DMAc solution containing 34% by mass of PSU; and in the heat treatment, the temperature of the hot-air drying was set to 100° C., and a pressure of 5 kg/cm² was applied. Image formation was performed in the same way as in Example 1 using the porous body, followed by evaluation. The results are shown in Tables 2 and 3.

Comparative Example 1

A porous body was prepared in the same way as in Example 1 except that a DMAc/THF (mass ratio: 2/8) solution containing 30% by mass of PSU was used as the resin solution. No pore structure in the fiber was confirmed in the porous body. Image formation was performed in the same way as in Example 1 using the porous body, followed by evaluation. The results are shown in Tables 2 and 3.

Comparative Example 2

A porous body was prepared in the same way as in Example 1 except that a DMAc/THF (mass ratio: 4/6) solution containing 25% by mass of PSU was used as the resin solution. Image formation was performed in the same way as in Example 1 using the porous body, followed by evaluation. The results are shown in Tables 2 and 3.

Comparative Example 3

A porous body was prepared in the same way as in Example 1 except that a DMAc solution containing 25% by mass of PSU was used as the resin solution. Image formation was performed in the same way as in Example 1 using the porous body, followed by evaluation. The results are shown in Tables 2 and 3.

Comparative Example 4

A porous body was prepared in the same way as in Example 1 except that in the heat treatment, the temperature of the hot-air drying was set to 140° C., and a pressure of 5 kg/cm² was applied. Image formation was performed in the same way as in Example 1 using the porous body, followed by evaluation. The results are shown in Tables 2 and 3.

Comparative Example 5

A porous body was prepared in the same way as in Example 1 except that the heat treatment was not performed. Image formation was performed in the same way as in Example 1 using the porous body, followed by evaluation. The results are shown in Tables 2 and 3.

Comparative Example 6

A porous body made of a PSU nonwoven fabric was prepared by thermal processing according to the spunbond method such that the inter-fiber void ratio was 40%. No pore structure in the fiber was confirmed in the porous body. Image formation was performed in the same way as in Example 1 using the porous body, followed by evaluation. The results are shown in Tables 2 and 3.

TABLE 2

| | | Resin solution | | Heat treatment | | Porous film | | | | |
| --- | --- | --- | --- | --- | --- | --- | --- | --- | --- | --- |
| | Fiber material | Resin concentration (% by mass) | Solvent | Temperature (° C.) | Pressure (kg/cm²) | Average fiber diameter (μm) | Average pore size (μm) | Average pore size/average fiber diameter | Intra-fiber void ratio (%) | Inter-fiber void ratio (%) |
| Example 1 | PSU | 25 | DMAc/THF = 5/5 | 120 | — | 1.5 | 0.3 | 0.2 | 5 | 80 |
| Example 2 | PSU | 30 | DMAc/THF = 6/4 | 120 | — | 2.0 | 0.4 | 0.2 | 5 | 80 |
| Example 3 | PSU | 30 | DMAc/THF = 7/3 | 120 | — | 2.0 | 0.4 | 0.2 | 40 | 80 |
| Example 4 | PSU | 25 | DMAc/THF/NMP = 6/3/1 | 120 | — | 1.8 | 0.3 | 0.17 | 40 | 80 |
| Example 5 | PSU | 25 | DMAc/THF = 5/5 | 120 | 3 | 1.5 | 0.3 | 0.2 | 5 | 40 |
| Example 6 | PSU | 34 | DMAc | 120 | — | 5.0 | 0.1 | 0.02 | 10 | 80 |
| Example 7 | PAN | 12 | DMF | 100 | 3 | 2.0 | 0.4 | 0.2 | 40 | 80 |
| Example 8 | PVDF | 20 | DMAc/MIBK = 5/5 | 80 | 5 | 2.0 | 0.4 | 0.2 | 40 | 80 |
| Example 9 | PSU PVDF | 34 20 | MIBK DMAc | 100 | 5 | 2.0 | 0.4 | 0.2 | 20 | 80 |
| Comparative Example 1 | PSU | 30 | DMAc/THF = 2/8 | 120 | — | 2.0 | — | — | 0 | 80 |
| Comparative Example 2 | PSU | 25 | DMAc/THF = 4/6 | 120 | — | 1.5 | 0.3 | 0.2 | 2 | 80 |
| Comparative Example 3 | PSU | 25 | DMAc | 120 | — | 1.5 | 0.3 | 0.2 | 50 | 80 |
| Comparative Example 4 | PSU | 25 | DMAc/THF = 5/5 | 140 | 5 | 1.5 | 0.3 | 0.2 | 5 | 30 |
| Comparative Example 5 | PSU | 25 | DMAc/THF = 5/5 | — | — | 1.5 | 0.3 | 0.2 | 5 | 85 |
| Comparative Example 6 | PSU | — | — | — | — | 7.0 | — | — | — | 40 |

TABLE 3

|  | 1st | 10th | 50th | 100th |
|---|---|---|---|---|
| Example 1 | A | A | A | B |
| Example 2 | A | A | A | B |
| Example 3 | A | A | A | A |
| Example 4 | A | A | A | A |
| Example 5 | A | B | B | B |
| Example 6 | A | A | B | B |
| Example 7 | A | A | A | B |
| Example 8 | A | A | A | B |
| Example 9 | A | A | B | B |
| Comparative Example 1 | C | C | C | C |
| Comparative Example 2 | B | B | C | C |
| Comparative Example 3 | B | B | B | C |
| Comparative Example 4 | B | C | C | C |
| Comparative Example 5 | B | B | C | C |
| Comparative Example 6 | C | C | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-129727, filed Jun. 30, 2017, which is hereby incorporated by reference herein in its entirety.

What is claimed is:

1. An ink jet printing apparatus comprising:
an ink application apparatus which applies ink onto an ink receiving medium to form an ink image; and
a liquid absorbing member having a porous body which comes into contact with the ink image and absorbs at least a portion of a liquid component from the ink image,
the porous body comprising a fiber having a pore structure in the inside, wherein
the pore structure satisfies the following requirements (a) and (b), and
an inter-fiber void ratio which indicates the volume ratio of a void formed between f the each fibers is 40% or more to 80% or less:
(a) average pore size/average fiber diameter is 0.2 or less; and
(b) an intra-fiber void ratio is 5% or more to 40% or less.

2. The ink jet printing apparatus according to claim 1, further comprising a reaction solution application apparatus which applies a reaction solution that is rendered highly viscous upon contact with the ink, onto the ink receiving medium.

3. The ink jet printing apparatus according to claim 1, wherein the ink receiving medium is a printing medium.

4. The ink jet printing apparatus according to claim 1, wherein the ink receiving medium is a transfer body, wherein the ink jet printing apparatus further comprises a pressing member for transfer which transfers the ink image after the liquid component removal to a printing medium by bringing the printing medium into contact with the transfer body.

* * * * *